United States Patent
Samec et al.

(10) Patent No.: US 12,441,701 B2
(45) Date of Patent: Oct. 14, 2025

(54) SOLID STATE FORMS OF ROLUPERIDONE AND SALTS THEREOF

(71) Applicant: TAPI CZECH INDUSTRIES S.R.O, Opava-Komarov (CZ)

(72) Inventors: Dijana Skalec Samec, Jastrebarsko (HR); Lorena Kordic, Rab (HR)

(73) Assignee: TAPI CZECH INDUSTRIES S.R.O., Komarov (CZ)

( * ) Notice: Subject to any disclaimer, the term of this patent is extended or adjusted under 35 U.S.C. 154(b) by 920 days.

(21) Appl. No.: 17/621,284

(22) PCT Filed: Jun. 29, 2020

(86) PCT No.: PCT/US2020/040091
§ 371 (c)(1),
(2) Date: Dec. 21, 2021

(87) PCT Pub. No.: WO2020/264486
PCT Pub. Date: Dec. 30, 2020

(65) Prior Publication Data
US 2022/0356165 A1 Nov. 10, 2022

Related U.S. Application Data

(60) Provisional application No. 62/942,800, filed on Dec. 3, 2019, provisional application No. 62/928,453, filed on Oct. 31, 2019, provisional application No. 62/878,902, filed on Jul. 26, 2019, provisional application No. 62/867,957, filed on Jun. 28, 2019.

(51) Int. Cl.
*C07D 401/06* (2006.01)

(52) U.S. Cl.
CPC ........ *C07D 401/06* (2013.01); *C07B 2200/13* (2013.01)

(58) Field of Classification Search
None
See application file for complete search history.

(56) References Cited

FOREIGN PATENT DOCUMENTS

| EP | 1260512 A1 | 11/2002 |
| WO | WO-2016089766 A1 * | 6/2016 ............ A61P 25/20 |

OTHER PUBLICATIONS

Mino R. Caira, "Crystalline Polymorphism of Organic Compounds" Topics in Current Chemistry, vol. 198, Jan. 1, 1998, pp. 163-208.
International Search Report and Written Opinion of the International Searching Authority issued in corresponding application PCT/US2020/040091 mailed Oct. 22, 2020 (18 pages).

* cited by examiner

*Primary Examiner* — Adam C Milligan
*Assistant Examiner* — Jed A Kucharczk
(74) *Attorney, Agent, or Firm* — Carter, DeLuca & Farrell LLP

(57) ABSTRACT

The present disclosure relates to solid state forms of roluperidone and salts thereof, processes for preparation thereof, and pharmaceutical compositions thereof.

20 Claims, 8 Drawing Sheets

Figure 2 shows a PXRD pattern of Roluperidone HCl, Form 1.

Figure 8 shows a PXRD pattern of Roluperidone HCl, Form 6.

SOLID STATE FORMS OF ROLUPERIDONE AND SALTS THEREOF

CROSS REFERENCE TO RELATED APPLICATIONS

This application is a National Stage of, and claims priority to and the benefit of, International Patent Application No. PCT/US2020/040091 filed Jun. 29, 2020, which, in turn, claims the benefit of and priority to, U.S. Provisional Patent Application No. 62/867,957 filed Jun. 28, 2019, U.S. Provisional Patent Application No. 62/878,902 filed Jul. 26, 2019, U.S. Provisional Patent Application No. 62/928,453 filed Oct. 31, 2019, and U.S. Provisional Patent Application No. 62/942,800 filed Dec. 3, 2019, the entire disclosures of each of which are incorporated by reference herein.

TECHNICAL FIELD

The present disclosure relates to solid state forms of roluperidone and salts thereof, processes for preparation thereof, and pharmaceutical compositions thereof.

BACKGROUND

Roluperidone has the chemical name 2-({1-[2-(4-Fluorophenyl)-2-oxoethyl]-4-piperidinyl}methyl)-1-isoindolinone. Roluperidone has the following chemical structure:

Roluperidone is reported to be a drug candidate with equipotent affinities for 5-hydroxytryptamine-$_{2A}$ (5-HT$_{2A}$) and sigma$_2$ and, at lower affinity levels, α1-adrenergic receptors. A pivotal Phase 3 clinical trial is ongoing with roluperidone as a monotherapy for negative symptoms in patients diagnosed with schizophrenia.

Roluperidone is known from U.S. Pat. No. 7,166,617.

Solid state form of 2-((1-(2-(4-Fluorophenyl)-2-oxoethyl)piperidin-4-yl)methyl)isoindolin-1-o-ne monohydrochloride dihydrate is known from U.S. Pat. No. 9,458,130.

Polymorphism, the occurrence of different crystal forms, is a property of some molecules and molecular complexes. A single compound, like roluperidone, may give rise to a variety of polymorphs having distinct crystal structures and physical properties like melting point, thermal behaviors (e.g. measured by thermogravimetric analysis—"TGA", or differential scanning calorimetry—"DSC"), powder X-ray diffraction (PXRD) pattern, infrared absorption fingerprint, Raman absorption fingerprint, and solid state ($^{13}$C—) NMR spectrum. One or more of these techniques may be used to distinguish different polymorphic forms of a compound.

Different salts and solid state forms (including solvated forms) of an active pharmaceutical ingredient may possess different properties. Such variations in the properties of different salts and solid state forms and solvates may provide a basis for improving formulation, for example, by facilitating better processing or handling characteristics, improving the dissolution profile, or improving stability (polymorph as well as chemical stability) and shelf-life. These variations in the properties of different salts and solid state forms may also provide improvements to the final dosage form, for instance, if they serve to improve bioavailability. Different salts and solid state forms and solvates of an active pharmaceutical ingredient may also give rise to a variety of polymorphs or crystalline forms, which may in turn provide additional opportunities to use variations in the properties and characteristics of a solid active pharmaceutical ingredient for providing an improved product.

Discovering new salts, solid state forms, and solvates of a pharmaceutical product can provide materials having desirable processing properties, such as ease of handling, ease of processing, storage stability, and ease of purification, or as desirable intermediate crystal forms that facilitate conversion to other salts or polymorphic forms. New salts, polymorphic forms and solvates of a pharmaceutically useful compound can also provide an opportunity to improve the performance characteristics of a pharmaceutical product (dissolution profile, bioavailability, etc.). It enlarges the repertoire of materials that a formulation scientist has available for formulation optimization, for example by providing a product with different properties, e.g., a different crystal habit, higher crystallinity, or polymorphic stability, which may offer better processing or handling characteristics, improved dissolution profile, or improved shelf-life.

For at least these reasons, crystalline forms (including solvated forms) of roluperidone and salts thereof having desirable properties remain desirable.

SUMMARY

The present disclosure relates to solid state forms of roluperidone and salts thereof, including co-crystal forms of roluperidone and salts thereof, to processes for preparation thereof, and to pharmaceutical compositions including these solid state forms.

The present disclosure also provides uses of the solid state forms of roluperidone and salts thereof for preparing other solid state forms of roluperidone, roluperidone salts and solid state forms thereof.

In another embodiment, the present disclosure encompasses the above described solid state forms of roluperidone and salts thereof for use as a medicament, in embodiments for the treatment of schizophrenia.

In another embodiment, the present disclosure encompasses methods for treating schizophrenia with the use of the above described solid state forms of roluperidone and salts thereof.

In a further embodiment, the present disclosure further provides the use of any of the solid state forms of roluperidone and salts thereof described according to any embodiment herein, for the preparation of a pharmaceutical composition or a pharmaceutical formulation of roluperidone, wherein the roluperidone in the pharmaceutical composition or formulation is in a solid form, wherein the solid form may be any crystalline form or an amorphous form.

The present disclosure further provides pharmaceutical compositions including the solid state forms of roluperidone and salts thereof according to the present disclosure.

In yet another embodiment, the present disclosure encompasses pharmaceutical formulations including the above described solid state forms of roluperidone and salts thereof and at least one pharmaceutically acceptable excipient, in embodiments for oral administration in dosage forms such as tablets, capsules, etc.

The present disclosure encompasses processes to prepare said pharmaceutical formulations of roluperidone by combining at least one of the above solid state forms or salts thereof and at least one pharmaceutically acceptable excipient.

The solid state forms as defined herein, as well as the pharmaceutical compositions or formulations of the solid state forms of roluperidone and salts thereof, can be used as medicaments, in embodiments for the treatment of schizophrenia.

The present disclosure also provides methods of treating schizophrenia, by administering a therapeutically effective amount of the solid state form of roluperidone and/or salts thereof of the present disclosure, or at least one of the above pharmaceutical compositions or formulations, to a subject suffering from schizophrenia, or otherwise in need of the treatment.

The present disclosure also provides use of the solid state forms of roluperidone and salts thereof of the present disclosure, or at least one of the above pharmaceutical compositions or formulations, for the manufacture of a medicament for treating schizophrenia.

DETAILED DESCRIPTION

The present disclosure relates to solid state forms of roluperidone and salts thereof, in embodiments to crystalline forms of roluperidone and roluperidone HCl, processes for preparation thereof, and pharmaceutical compositions including said solid state forms.

The solid state forms of roluperidone according to the present disclosure may have advantageous properties selected from at least one of: chemical or polymorphic purity, flowability, solubility, dissolution rate, bioavailability, morphology or crystal habit, stability—such as chemical stability as well as thermal and mechanical stability with respect to polymorphic conversion, stability towards dehydration and/or storage stability, a lower degree of hygroscopicity, low content of residual solvents, and advantageous processing and handling characteristics such as compressibility, or bulk density.

A crystal form may be referred to herein as being characterized by graphical data "as depicted in" a Figure. Such data include, for example, powder X-ray diffractograms and solid state NMR spectra. As is well-known in the art, the graphical data potentially provides additional technical information to further define the respective solid state form (a so-called "fingerprint") which can not necessarily be described by reference to numerical values or peak positions alone. In any event, the skilled person will understand that such graphical representations of data may be subject to small variations, e.g., in peak relative intensities and peak positions due to factors such as variations in instrument response and variations in sample concentration and purity, which are well known to the skilled person. Nonetheless, the skilled person would readily be capable of comparing the graphical data in the Figures herein with graphical data generated for an unknown crystal form and confirm whether the two sets of graphical data are characterizing the same crystal form or two different crystal forms. A crystal form of roluperidone and salts thereof referred to herein as being characterized by graphical data "as depicted in" a Figure will thus be understood to include any crystal forms of the roluperidone and salts thereof, characterized with the graphical data having such small variations, as are well known to the skilled person, in comparison with the Figure.

A solid state form (or polymorph) may be referred to herein as polymorphically pure or substantially free of any other solid state (or polymorphic) forms. As used herein in this context, the expression "substantially free of any other forms" will be understood to mean that the solid state form contains about 20% or less, about 10% or less, about 5% or less, about 2% or less, about 1% or less, or about 0% of any other forms of the subject compound as measured, for example, by PXRD. Thus, solid state forms of roluperidone and roluperidone salts, described herein as substantially free of any other solid state forms, would be understood to contain greater than about 80% (w/w), greater than about 90% (w/w), greater than about 95% (w/w), greater than about 98% (w/w), greater than about 99% (w/w), or about 100% (w/w) of the subject solid state form of roluperidone and/or roluperidone salts. Accordingly, in some embodiments of the disclosure, the described solid state forms of roluperidone and/or roluperidone salts may contain from about 1% to about 20% (w/w), from about 5% to about 20% (w/w), or from about 5% to about 10% (w/w) of one or more other solid state forms of the same roluperidone and/or roluperidone salts.

"Co-Crystal" or "Cocrystal" as used herein is defined as a crystalline material including two or more molecules in the same crystalline lattice and associated by non-ionic and non-covalent bonds. In some embodiments, the cocrystal includes two molecules which are in natural state.

"Cocrystal former" or "crystal former" as used herein is defined as a molecule that forms a cocrystal with roluperidone or salts thereof, for example maleic acid.

As used herein, solid state forms of roluperidone and roluperidone salts include co-crystal forms of roluperidone (and salts thereof) and a crystal former.

As used herein, unless stated otherwise, PXRD peaks reported herein are measured using $CuK_\alpha$ radiation, $\lambda=1.5418$ Å.

As used herein, the term "isolated" in reference to solid state forms of roluperidone and roluperidone salts of the present disclosure corresponds to solid state forms of roluperidone and roluperidone salts that are physically separated from the reaction mixture in which they are formed.

A thing, e.g., a reaction mixture, may be characterized herein as being at, or allowed to come to "room temperature", often abbreviated "RT." This means that the temperature of the thing is close to, or the same as, that of the space, e.g., the room or fume hood, in which the thing is located. Typically, room temperature is from about 20° C. to about 30° C., or about 22° C. to about 27° C., or about 25° C. A process or step may be referred to herein as being carried out "overnight." This refers to a time interval, e.g., for the process or step, that spans the time during the night, when that process or step may not be actively observed. This time interval is from about 8 to about 20 hours, or about 10 to about 18 hours, in embodiments about 16 hours.

The term "solvate", as used herein and unless indicated otherwise, refers to a crystal form that incorporates a solvent in the crystal structure. When the solvent is water, the solvate is often referred to as a "hydrate." The solvent in a solvate may be present in either a stoichiometric or in a non-stoichiometric amount.

As used herein, and unless stated otherwise, the term "anhydrous" in relation to crystalline roluperidone relates to a crystalline roluperidone which does not include any crystalline water (or other solvents) in a defined, stoichiometric amount within the crystal. Moreover, an "anhydrous" form does not contain more than 1% (w/w) of either water or organic solvents as measured, for example, by TGA.

The crystal hydrate indicated by water analysis by Karl Fischer (KF) titration or by TGA analysis of the product is believed to have been produced as a result of water introduced from the atmosphere in which this material was processed, or by traces of water present in the solvents that were in contact with the material, or a combination of these factors.

The amount of solvent employed in a chemical process, e.g., a reaction or a crystallization, may be referred to herein as a number of "volumes" or "vol" or "V." For example, a material may be referred to as being suspended (or dissolved) in 10 volumes (or 10 vol or 10V) of a solvent. In this context, this expression would be understood to mean milliliters of the solvent per gram of the material being suspended (or dissolved), such that suspending (or dissolving) 5 grams of a material in 10 volumes of a solvent means that the solvent is used in an amount of 10 milliliters of the solvent per gram of the material that is being suspended (or dissolved) or, in this example, 50 mL of the solvent. In another context, the term "v/v" may be used to indicate the number of volumes of a solvent that are added to a liquid mixture based on the volume of that mixture. For example, adding methyl tert-butyl ether (MTBE) (1.5 v/v) to a 100 ml reaction mixture would indicate that 150 mL of MTBE was added.

As used herein, the term "reduced pressure" refers to a pressure of about 10 mbar to about 50 mbar.

As used herein, Form A of roluperidone HCl refers to the crystalline form disclosed in U.S. Pat. No. 9,730,920. As described therein, Form A of roluperidone HCl is a dihydrate, described as having various characteristic XRPD peaks, for example at: 7.6, 11.2, 14.3, 14.7, 14.9, 18.6, 22.0, 25.9, 27.5 and 30.1 degrees 2-theta±0.2 degrees 2-theta. Example 4 of U.S. Pat. No. 9,730,920 describes a preparation of Form A of roluperidone HCl. Form A may be obtained according to Example 1 of the present application.

The present disclosure includes a crystalline form of roluperidone HCl designated as form 1. The crystalline form 1 of roluperidone HCl can be characterized by data selected from one or more of the following: a PXRD pattern having peaks at 8.2, 15.8, 17.9, 18.9 and 19.3 degrees 2-theta±0.2 degrees 2-theta; a PXRD pattern as depicted in FIG. 2, and combinations of these data.

Crystalline form 1 of roluperidone HCl may be further characterized by a PXRD pattern having peaks at 8.2, 15.8, 17.9, 18.9 and 19.3 degrees 2-theta±0.2 degrees 2-theta, and also having one, two or three additional peaks at 20.6, 25.5 and 26.9 degrees 2-theta±0.2 degrees 2-theta.

Alternatively, crystalline form 1 of roluperidone HCl may be characterized by a PXRD pattern having peaks at 8.2, 15.8, 17.9, 18.9, 19.3, 20.6, 25.5 and 26.9 degrees 2-theta±0.2 degrees 2-theta.

Figure 1:
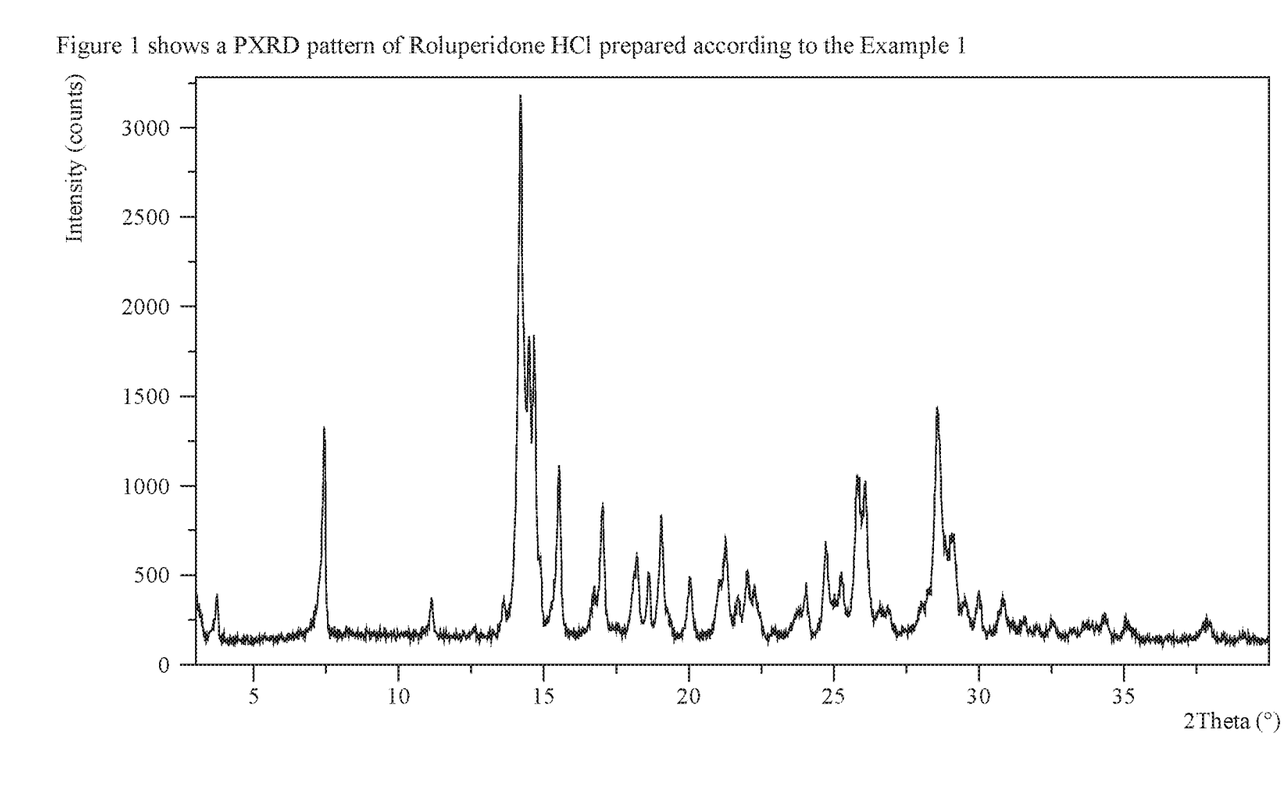
FIG. 1 shows a powder X-ray diffraction pattern ("powder XRD" or "PXRD") of Roluperidone HCl, prepared according to Example 1.
Figure 2:
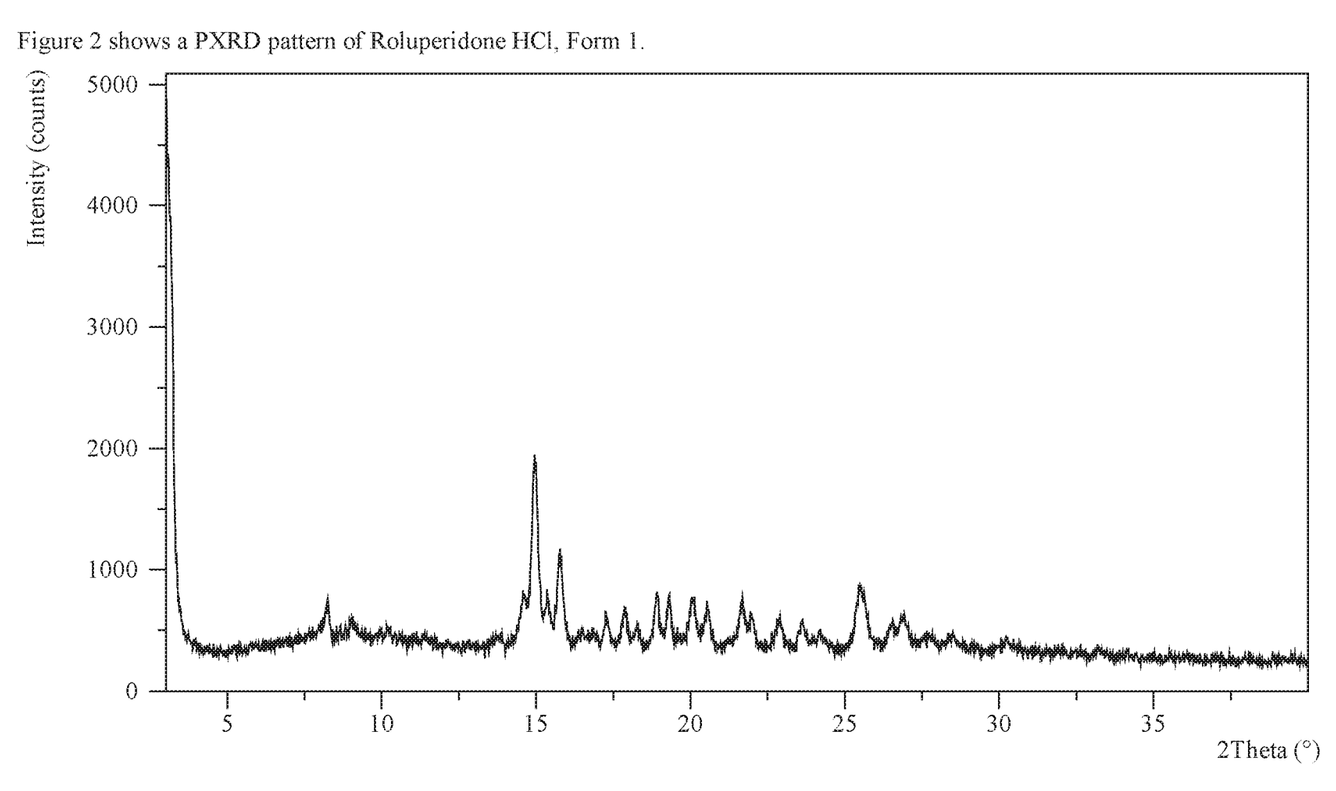
FIG. 2 shows a PXRD of Roluperidone HCl form 1.

Crystalline form 1 of roluperidone HCl may be characterized by each of the above characteristics alone or by all possible combinations, e.g., by a PXRD pattern having peaks at 8.2, 15.8, 17.9, 18.9 and 19.3 degrees 2-theta±0.2 degrees 2-theta and a PXRD pattern as depicted in FIG. 2.

The present disclosure includes a crystalline form of roluperidone HCl designated as form 2. The crystalline form 2 of roluperidone HCl can be characterized by data selected from one or more of the following: a PXRD pattern having peaks at 4.9, 10.6, 16.4, 19.5 and 19.9 degrees 2-theta±0.2 degrees 2-theta; a PXRD pattern as depicted in FIG. 3 and combinations of these data.

Crystalline form 2 of roluperidone HCl may be further characterized by a PXRD pattern having peaks at 4.9, 10.6, 16.4, 19.5 and 19.9 degrees 2-theta±0.2 degrees 2-theta, and also having one, two, three, four or five additional peaks at 12.7, 15.0, 17.3, 21.7 and 26.2 degrees 2-theta±0.2 degrees 2-theta.

Alternatively, crystalline form 2 of roluperidone HCl may be characterized by a PXRD pattern having peaks at 4.9, 10.6, 12.7, 15.0, 16.4, 17.3, 19.5, 19.9, 21.7 and 26.2 degrees 2-theta±0.2 degrees 2-theta.

Figure 3:
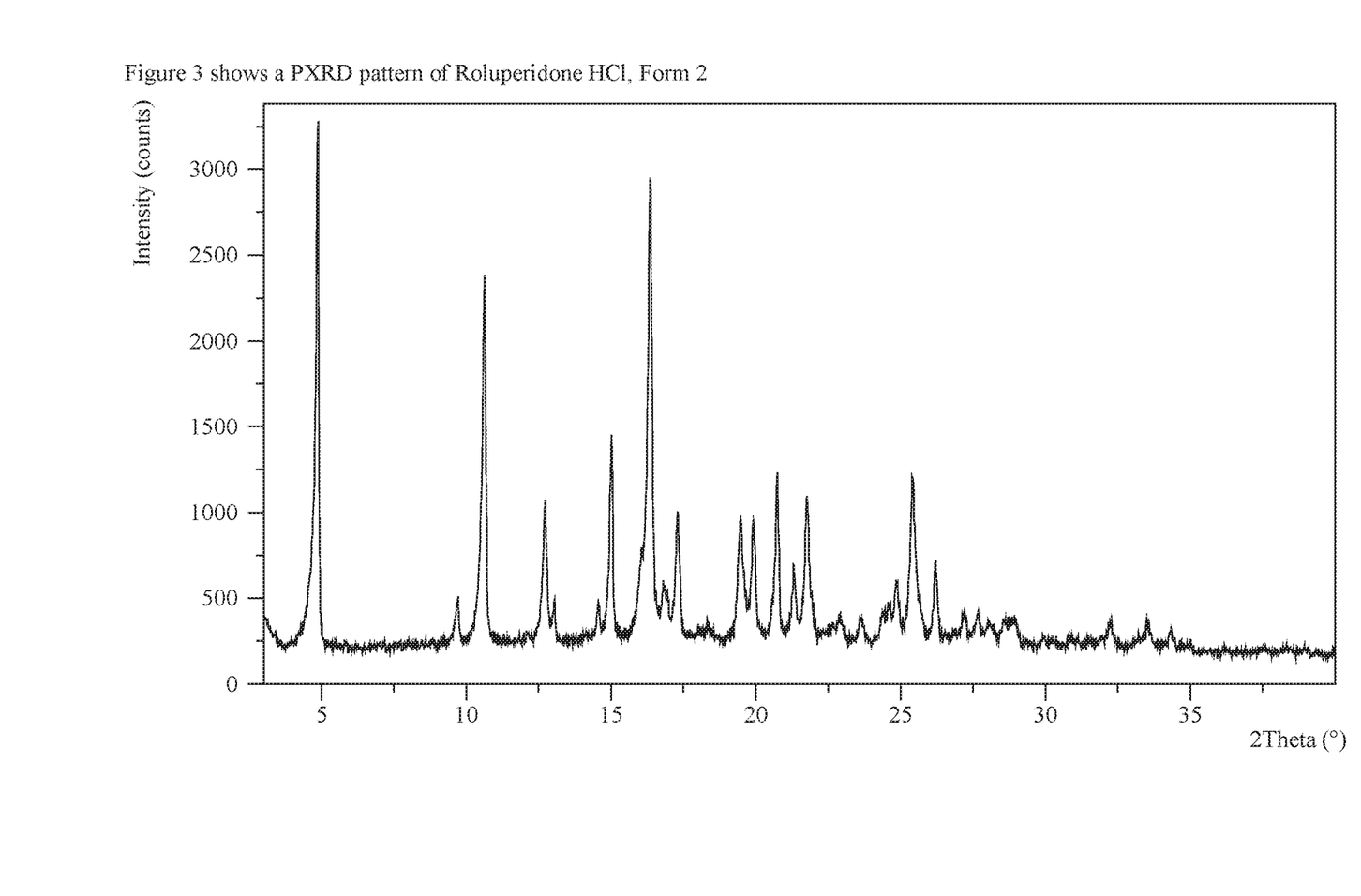
FIG. 3 shows a PXRD of Roluperidone HCl form 2.

Crystalline form 2 of roluperidone HCl may be characterized by each of the above characteristics alone or by all possible combinations, e.g., by a PXRD pattern having peaks at 4.9, 10.6, 16.4, 19.5 and 19.9 degrees 2-theta±0.2 degrees 2-theta and a PXRD pattern as depicted in FIG. 3.

The present disclosure includes a crystalline form of roluperidone HCl designated as form 3. The crystalline form 3 of roluperidone HCl can be characterized by data selected from one or more of the following: a PXRD pattern having peaks at 4.3, 11.7, 12.6, 19.8 and 22.3 degrees 2-theta±0.2 degrees 2-theta; a PXRD pattern as depicted in FIG. 4 and combinations of these data.

Crystalline form 3 of roluperidone HCl may be further characterized by a PXRD pattern having peaks at 4.3, 11.7, 12.6, 19.8 and 22.3 degrees 2-theta±0.2 degrees 2-theta, and also having one, two, three, four or five additional peaks at 6.9, 17.6, 18.5, 23.6 and 26.8 degrees 2-theta±0.2 degrees 2-theta.

Alternatively, crystalline form 3 of roluperidone HCl may be characterized by a PXRD pattern having peaks at 4.3, 6.9, 11.7, 12.6, 17.6, 18.5, 19.8, 22.3, 23.6 and 26.8 degrees 2-theta±0.2 degrees 2-theta.

Figure 4:
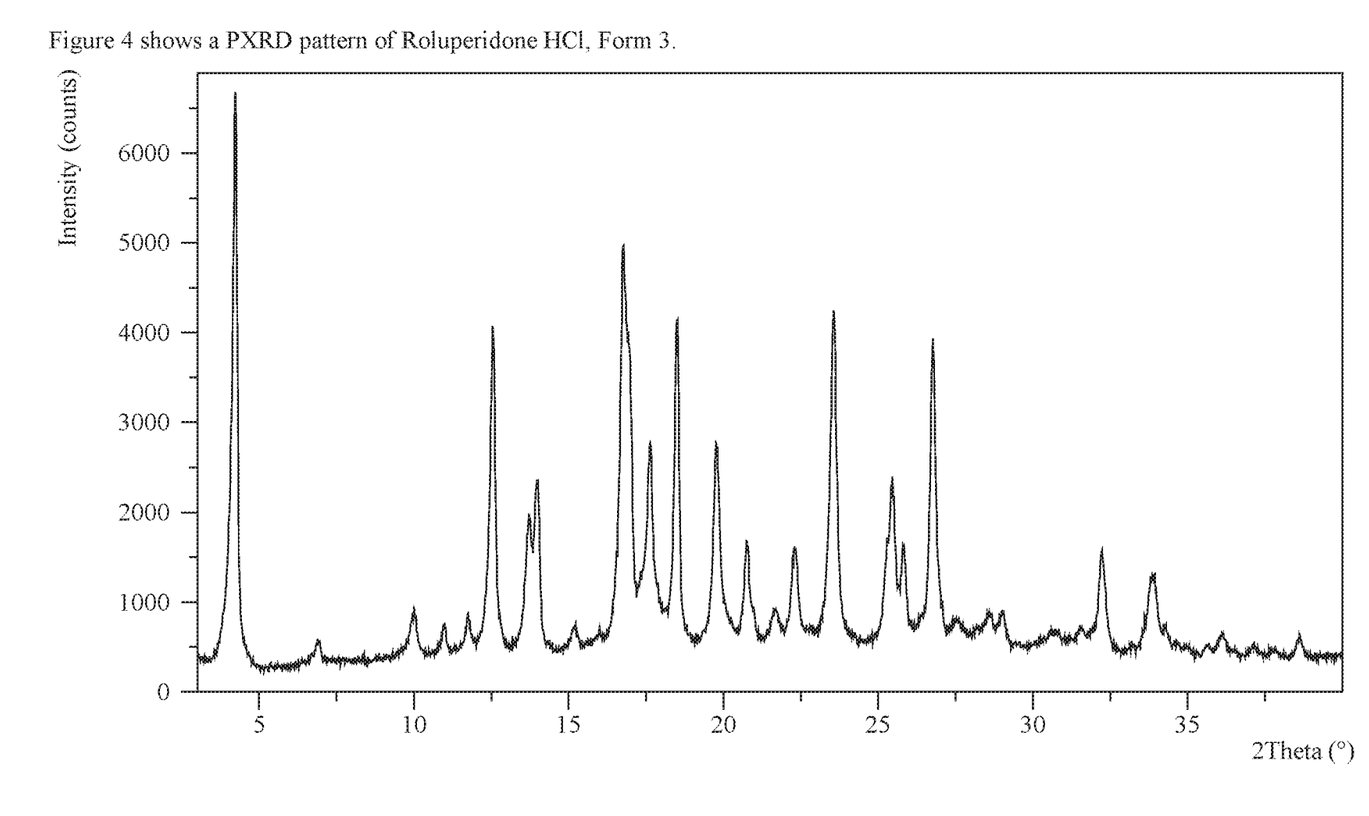
FIG. 4 shows a PXRD of Roluperidone HCl form 3.

Crystalline form 3 of roluperidone HCl may be characterized by each of the above characteristics alone or by all possible combinations, e.g., by a PXRD pattern having peaks at 4.3, 11.7, 12.6, 19.8 and 22.3 degrees 2-theta±0.2 degrees 2-theta and a PXRD pattern as depicted in FIG. 4.

Figure 5:
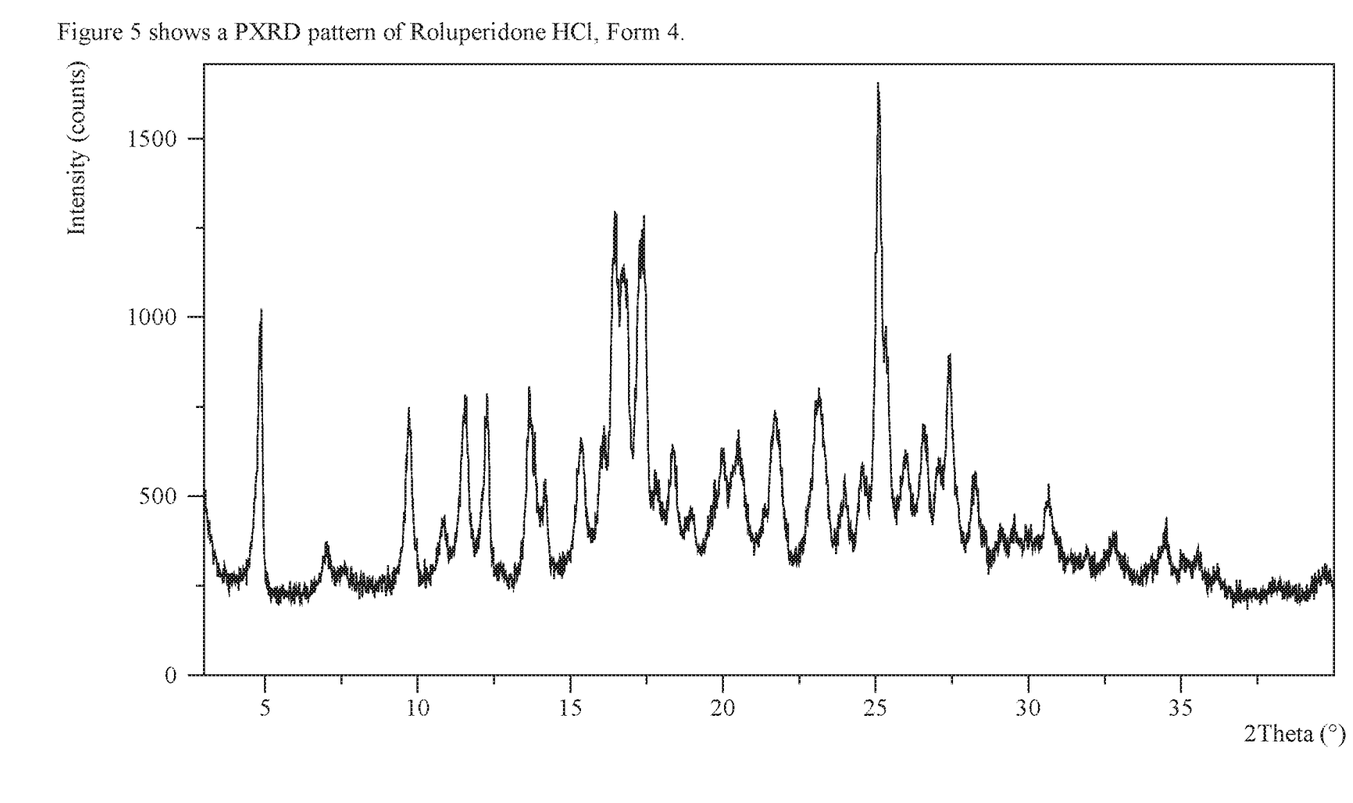
FIG. 5 shows a PXRD of Roluperidone HCl form 4.

The present disclosure includes a crystalline form of roluperidone HCl designated as form 4. The crystalline form 4 of roluperidone HCl can be characterized by data selected from one or more of the following: a PXRD pattern having peaks at 9.8, 11.6, 12.3, 20.5 and 25.1 degrees 2-theta±0.2 degrees 2-theta; a PXRD pattern as depicted in FIG. 5 and combinations of these data.

Crystalline form 4 of roluperidone HCl may be further characterized by a PXRD pattern having peaks at 9.8, 11.6, 12.3, 20.5 and 25.1 degrees 2-theta±0.2 degrees 2-theta, and also having one, two, three, four or five additional peaks at 11.6, 15.4, 18.9, 23.0 and 24.0 degrees 2-theta±0.2 degrees 2-theta.

Crystalline form of roluperidone HCl may alternatively be characterized by a PXRD pattern having peaks at 9.8, 11.6, 12.3, 20.5 and 25.1 degrees 2-theta±0.2 degrees 2-theta; and also having one, two, three, or four additional peaks at 15.4, 18.9, 23.0 and 24.0 degrees 2-theta±0.2 degrees 2-theta.

Alternatively, crystalline form 4 of roluperidone HCl may be characterized by a PXRD pattern having peaks at 9.8, 12.3, 20.5 and 25.1 degrees 2-theta±0.2 degrees 2-theta. Optionally, the crystalline form 4 of roluperidone may be characterized by a PXRD pattern having peaks at 9.8, 12.3, 20.5 and 25.1 degrees 2-theta±0.2 degrees 2-theta, and also having one, two, three, four or five additional peaks at 11.6, 15.4, 18.9, 23.0 and 24.0 degrees 2-theta±0.2 degrees 2-theta.

Alternatively, crystalline form 4 of roluperidone HCl may be characterized by a PXRD pattern having peaks at 9.8, 11.6, 12.3, 15.4, 18.9, 20.5, 23.0, 24.0 and 25.1 degrees 2-theta±0.2 degrees 2-theta.

Crystalline form 4 of roluperidone HCl may be a hydrate. Crystalline form 4 of roluperidone HCl may exist from hemihydrate to monohydrate. Crystalline form 4 of roluperidone HCl may contain water in an amount between 0.5 to 1 mole of water.

Crystalline form 4 of roluperidone HCl may be characterized by each of the above characteristics alone or by all possible combinations, e.g., by a PXRD pattern having peaks at 9.8, 11.6, 12.3, 20.5 and 25.1 degrees 2-theta±0.2 degrees 2-theta and a PXRD pattern as depicted in FIG. 5.

The present disclosure includes a crystalline form of roluperidone designated as form I. The crystalline form I of roluperidone can be characterized by data selected from one or more of the following: a PXRD pattern having peaks at 7.1, 14.3, 17.0, 17.6 and 18.3 degrees 2-theta±0.2 degrees 2-theta; a PXRD pattern as depicted in FIG. 6, and combinations of these data.

Crystalline form I of roluperidone may be further characterized by a PXRD pattern having peaks at 7.1, 14.3, 17.0, 17.6 and 18.3 degrees 2-theta±0.2 degrees 2-theta, and also having one, two, three, four or five additional peaks at 19.0, 20.5, 24.0, 28.7, and 31.9 degrees 2-theta±0.2 degrees 2-theta.

Alternatively, crystalline form I of roluperidone may be characterized by a PXRD pattern having peaks at 7.1, 14.3, 17.0, 17.6, 18.3, 19.0, 20.5, 24.0, 28.7, and 31.9 degrees 2-theta±0.2 degrees 2-theta.

Figure 6:
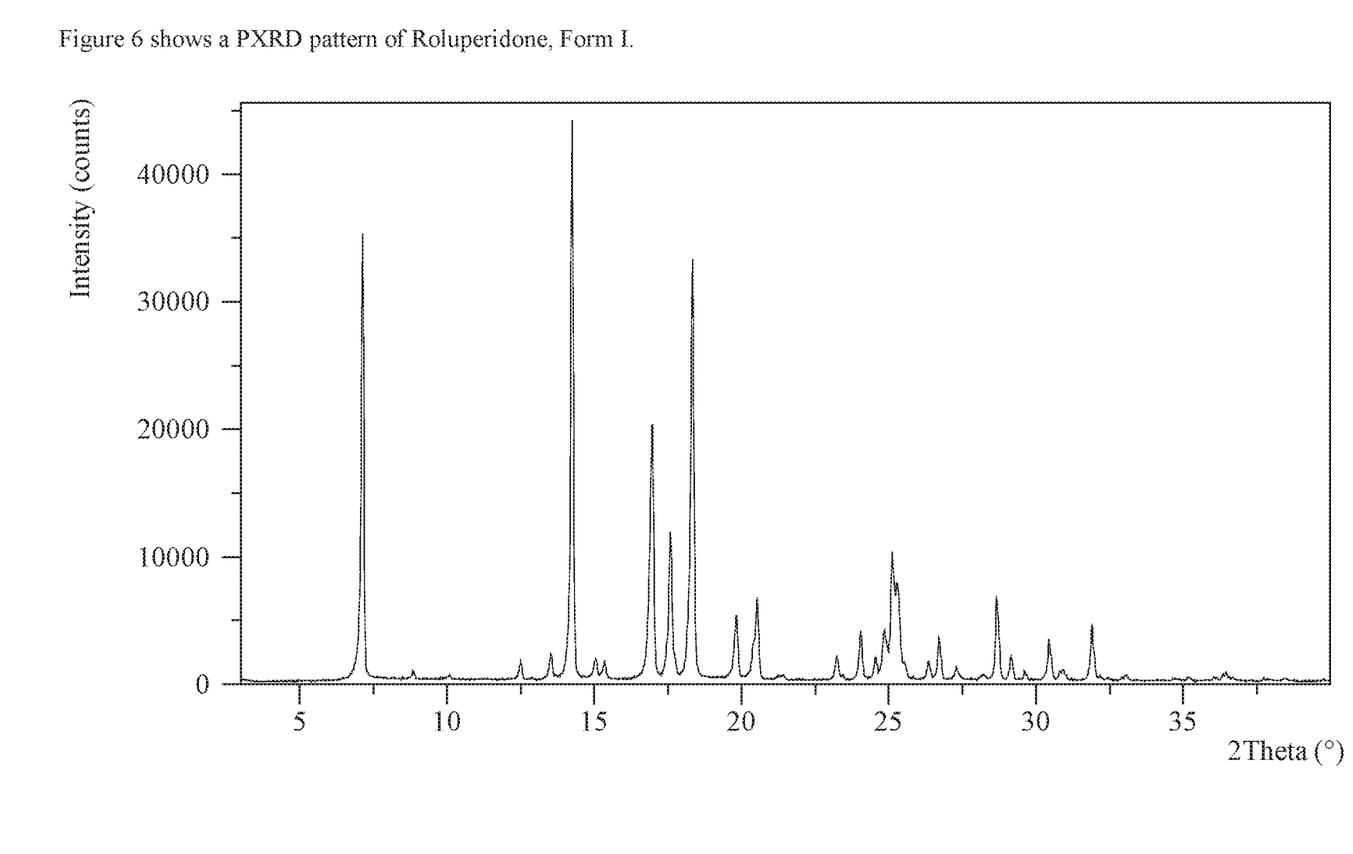
FIG. 6 shows a PXRD of Roluperidone form I.

Crystalline form I of roluperidone may be characterized by each of the above characteristics alone or by all possible combinations, e.g., by a PXRD pattern having peaks at 7.1, 14.3, 17.0, 17.6 and 18.3 degrees 2-theta±0.2 degrees 2-theta and a PXRD pattern as depicted in FIG. 6.

The present disclosure includes co-crystal forms of roluperidone HCl and maleic acid (roluperidone HCl:maleic acid).

The present disclosure includes a co-crystal of roluperidone HCl and maleic acid designated as form M1. Form M1 of roluperidone HCl and maleic acid co-crystal can be characterized by data selected from one or more of the following: a PXRD pattern having peaks at 5.3, 7.9, 10.5, 13.1 and 14.8 degrees 2-theta±0.2 degrees 2-theta; a PXRD pattern as depicted in FIG. 7, and combinations of these data.

Form M1 of roluperidone HCl and maleic acid co-crystal may be further characterized by a PXRD pattern having peaks at 5.3, 7.9, 10.5, 13.1 and 14.8 degrees 2-theta±0.2 degrees 2-theta, and also having one, two, three, four or five additional peaks at 15.8, 16.5, 18.4, 24.9 and 30.3 degrees 2-theta±0.2 degrees 2-theta.

Alternatively, Form M1 of roluperidone HCl and maleic acid co-crystal may be characterized by a PXRD pattern having peaks at 5.3, 7.9, 10.5, 13.1, 14.8, 15.8, 16.5, 18.4, 24.9 and 30.3 degrees 2-theta±0.2 degrees 2-theta.

Figure 7:
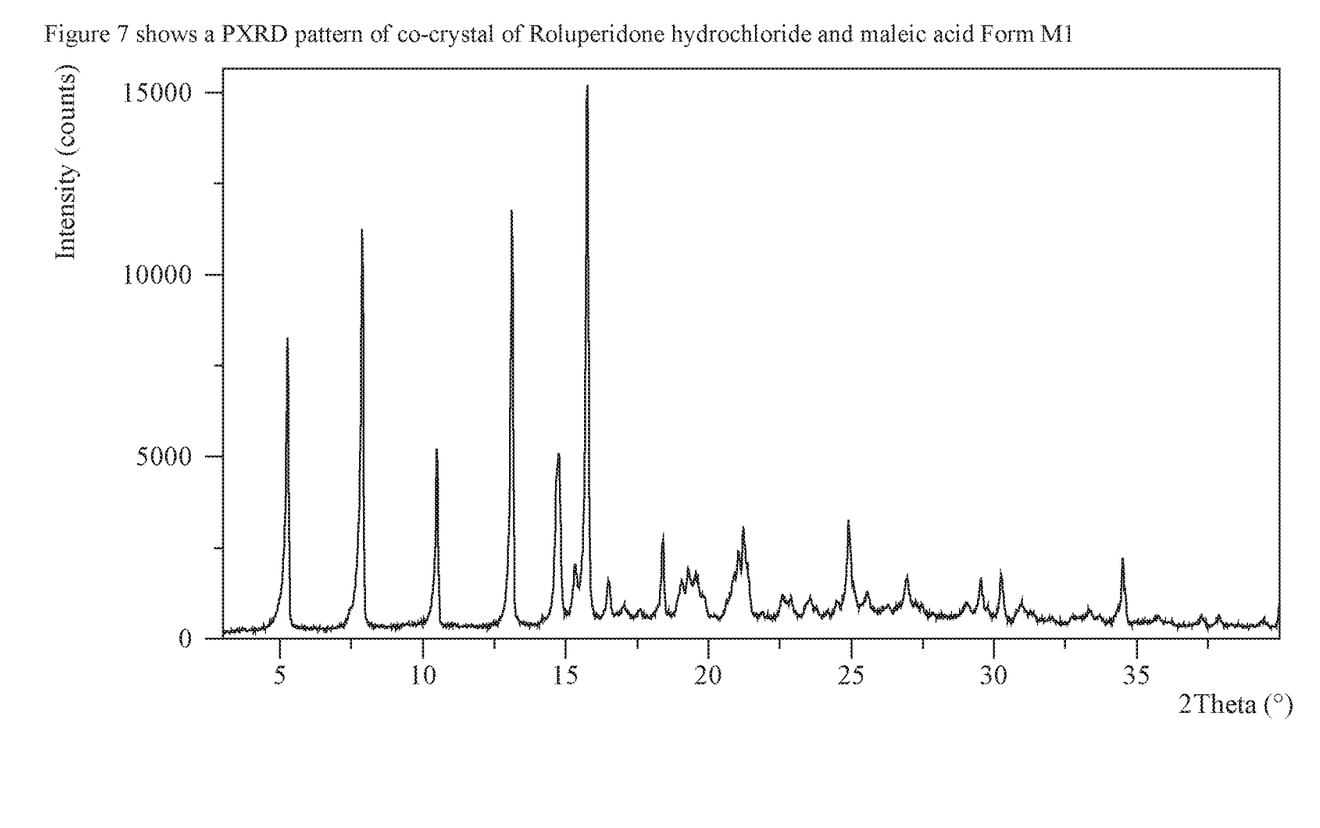
FIG. 7 shows a PXRD of co-crystal of Roluperidone HCl and maleic acid form M1.

Form M1 of roluperidone HCl and maleic acid co-crystal may be characterized by each of the above characteristics alone or by all possible combinations, e.g., by a PXRD pattern having peaks at 5.3, 7.9, 10.5, 13.1 and 14.8 degrees 2-theta±0.2 degrees 2-theta and a PXRD pattern as depicted in FIG. 7.

Form M1 of roluperidone HCl and maleic acid co-crystal according to any of the above embodiments may be in a molar ratio between about 2.5:1.5 and 1:1, between about 2.5:1.25 and 2.25:1, in another embodiment in a molar ratio of about 2:1.

Form M1 of roluperidone HCl and maleic acid co-crystal according to any of the above embodiments may be an anhydrous form.

The present disclosure includes a crystalline form of roluperidone HCl designated as form 6. The crystalline form 6 of roluperidone HCl can be characterized by data selected from one or more of the following: a PXRD pattern having peaks at 12.6, 16.9, 17.5 and 18.1 degrees 2-theta±0.2 degrees 2-theta; a PXRD pattern as depicted in FIG. 8 and combinations of these data.

Crystalline form 6 of roluperidone HCl may be further characterized by a PXRD pattern having peaks at 12.6, 16.9, 17.5 and 18.1 degrees 2-theta±0.2 degrees 2-theta, and also having one, two, three, four or five additional peaks at 10.5, 15.8, 16.4, 23.8 and 26.2 degrees 2-theta±0.2 degrees 2-theta.

Alternatively, crystalline form 6 of roluperidone HCl may be characterized by a PXRD pattern having peaks at 10.5, 12.6, 15.8, 16.4, 16.9, 17.5, 18.1, 23.8 and 26.2 degrees 2-theta±0.2 degrees 2-theta.

Figure 8:
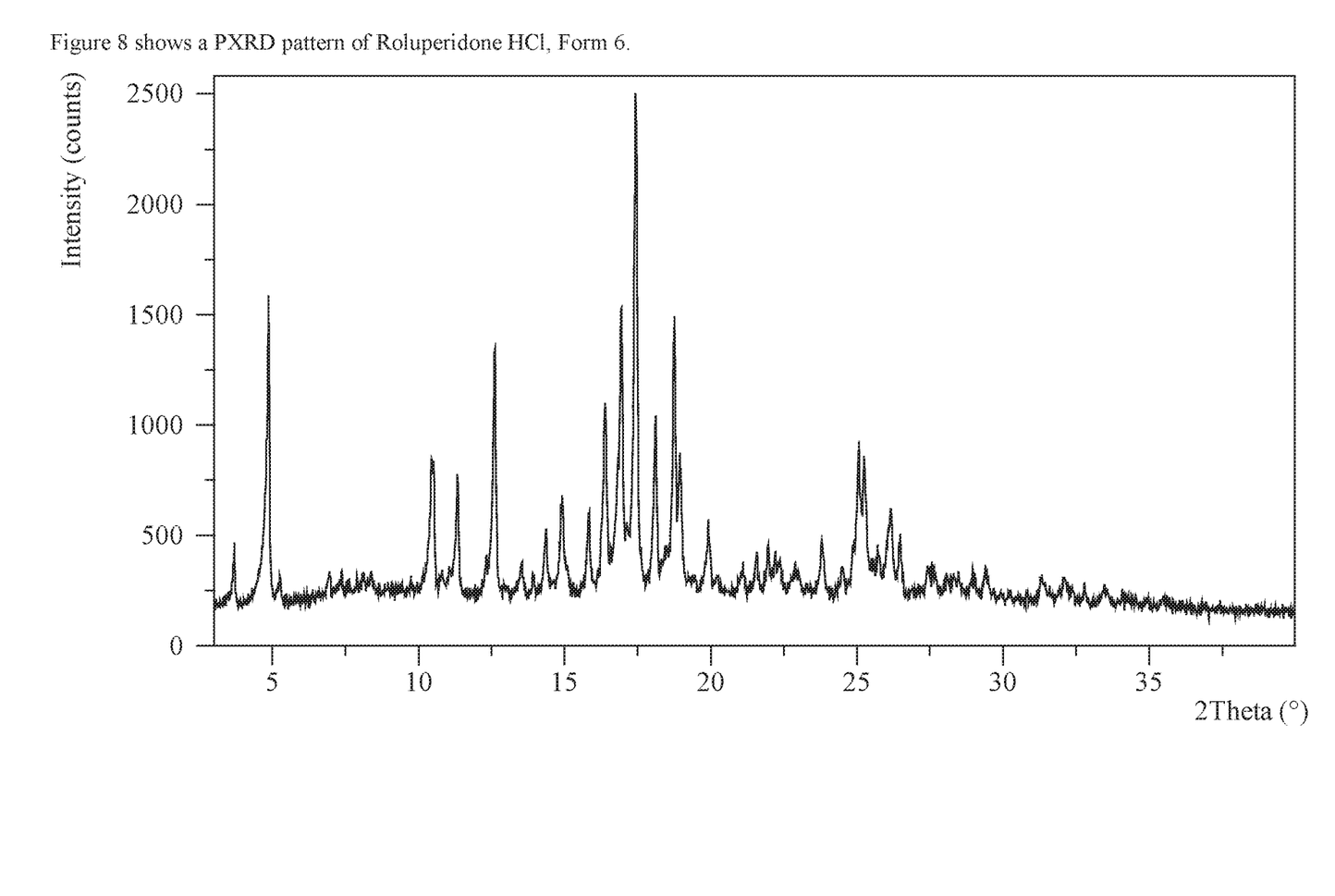
FIG. 8 shows a PXRD of Roluperidone HCl form 6.

Crystalline form 6 of roluperidone HCl may be characterized by each of the above characteristics alone or by all possible combinations, e.g., by a PXRD pattern having peaks at 12.6, 16.9, 17.5 and 18.1 degrees 2-theta±0.2 degrees 2-theta and a PXRD pattern as depicted in FIG. 8.

The present disclosure also provides the use of the solid state forms of roluperidone and roluperidone salts for preparing other solid state forms of roluperidone, roluperidone salts and solid state forms thereof.

The present disclosure further encompasses processes for preparing other solid state forms of roluperidone, or solid state forms thereof, as well as other roluperidone salts or solid state forms thereof. The process includes preparing the solid state form of the present disclosure, and converting it to other solid state forms of roluperidone. Alternatively, the process includes preparing the solid state form of the present disclosure, and converting it to roluperidone salt and solid state forms thereof. The conversion can be done, for example, by a process including reacting the obtained roluperidone with an appropriate acid such as hydrochloride acid.

In another embodiment the present disclosure encompasses the above described solid state forms of roluperidone and salts thereof, for use in the preparation of pharmaceutical compositions and/or formulations, in embodiments for the treatment of schizophrenia. In embodiments the present disclosure encompasses the use of the above described solid state forms of roluperidone and salts thereof for the preparation of a pharmaceutical composition including roluperidone or salt thereof.

In another embodiment the present disclosure encompasses the use of the above described solid state forms of roluperidone and salts thereof, or combinations thereof, for the preparation of pharmaceutical compositions and/or formulations, in embodiments oral formulations, e.g., tablets or capsules. In embodiments the present disclosure encompasses the above described solid state forms of roluperidone and/or salts thereof, for the preparation of a pharmaceutical composition or formulation, in embodiments an oral formulation in the form of a modified release tablet.

The present disclosure further provides pharmaceutical compositions including the solid state forms of roluperidone and salts thereof, or combinations thereof, according to the present disclosure.

In yet another embodiment, the present disclosure encompasses pharmaceutical formulations including at least one of the above described solid state forms of roluperidone and/or salts thereof, and at least one pharmaceutically acceptable excipient.

Pharmaceutical formulations of the present disclosure contain any one or a combination of the solid state forms of roluperidone of the present disclosure. In addition to the active ingredient, the pharmaceutical formulations of the present disclosure can contain one or more excipients. Excipients are added to the formulation for a variety of purposes.

Diluents increase the bulk of a solid pharmaceutical composition, and can make a pharmaceutical dosage form containing the composition easier for the patient and caregiver to handle. Diluents for solid compositions include, for example, microcrystalline cellulose (e.g. Avicel®), microfine cellulose, lactose, starch, pregelatinized starch, calcium carbonate, calcium sulfate, sugar, dextrates, dextrin, dextrose, dibasic calcium phosphate dihydrate, tribasic calcium phosphate, kaolin, magnesium carbonate, magnesium oxide, maltodextrin, mannitol, polymethacrylates (e.g. Eudragit®), potassium chloride, powdered cellulose, sodium chloride, sorbitol, and talc.

Solid pharmaceutical compositions that are compacted into a dosage form, such as a tablet, can include excipients whose functions include helping to bind the active ingredient and other excipients together after compression. Binders for solid pharmaceutical compositions include acacia, alginic acid, carbomer (e.g. carbopol), carboxymethylcellulose sodium, dextrin, ethyl cellulose, gelatin, guar gum, hydrogenated vegetable oil, hydroxyethyl cellulose, hydroxypropyl cellulose (e.g. Klucel®), hydroxypropyl methyl cellulose (e.g. Methocel®), liquid glucose, magnesium aluminum silicate, maltodextrin, methylcellulose, polymethacrylates, povidone (e.g. Kollidon®, Plasdone®), pregelatinized starch, sodium alginate, and starch.

The dissolution rate of a compacted solid pharmaceutical composition in the patient's stomach can be increased by the addition of a disintegrant to the composition. Disintegrants include alginic acid, carboxymethylcellulose calcium, carboxymethylcellulose sodium (e.g. Ac-Di-Sol®, Primellose®), colloidal silicon dioxide, croscarmellose sodium, crospovidone (e.g. Kollidon®, Polyplasdone®), guar gum, magnesium aluminum silicate, methyl cellulose, microcrystalline cellulose, polacrilin potassium, powdered cellulose, pregelatinized starch, sodium alginate, sodium starch glycolate (e.g. Explotab®), and starch.

Glidants can be added to improve the flowability of a non-compacted solid composition and to improve the accuracy of dosing. Excipients that can function as glidants include colloidal silicon dioxide, magnesium trisilicate, powdered cellulose, starch, talc, and tribasic calcium phosphate.

When a dosage form such as a tablet is made by the compaction of a powdered composition, the composition is subjected to pressure from a punch and dye. Some excipients and active ingredients have a tendency to adhere to the surfaces of the punch and dye, which can cause the product to have pitting and other surface irregularities. A lubricant can be added to the composition to reduce adhesion and ease the release of the product from the dye. Lubricants include magnesium stearate, calcium stearate, glyceryl monostearate, glyceryl palmitostearate, hydrogenated castor oil, hydrogenated vegetable oil, mineral oil, polyethylene glycol, sodium benzoate, sodium lauryl sulfate, sodium stearyl fumarate, stearic acid, talc, and zinc stearate.

Flavoring agents and flavor enhancers make the dosage form more palatable to the patient. Common flavoring agents and flavor enhancers for pharmaceutical products that can be included in the composition of the present disclosure include maltol, vanillin, ethyl vanillin, menthol, citric acid, fumaric acid, ethyl maltol, and tartaric acid.

Solid and liquid compositions can also be dyed using any pharmaceutically acceptable colorant to improve their appearance and/or facilitate patient identification of the product and unit dosage level.

In liquid pharmaceutical compositions of the present disclosure, the active ingredient and any other solid excipients are dissolved or suspended in a liquid carrier such as water, vegetable oil, alcohol, polyethylene glycol, propylene glycol, or glycerin.

Liquid pharmaceutical compositions can contain emulsifying agents to disperse uniformly throughout the composition an active ingredient or other excipient that is not soluble in the liquid carrier. Emulsifying agents that can be useful in liquid compositions of the present disclosure include, for example, gelatin, egg yolk, casein, cholesterol, acacia, tragacanth, chondrus, pectin, methyl cellulose, carbomer, cetostearyl alcohol, and cetyl alcohol.

Liquid pharmaceutical compositions of the present disclosure can also contain a viscosity enhancing agent to improve the mouth-feel of the product and/or coat the lining of the gastrointestinal tract. Such agents include acacia, alginic acid bentonite, carbomer, carboxymethylcellulose calcium or sodium, cetostearyl alcohol, methyl cellulose, ethylcellulose, gelatin guar gum, hydroxyethyl cellulose, hydroxypropyl cellulose, hydroxypropyl methyl cellulose, maltodextrin, polyvinyl alcohol, povidone, propylene carbonate, propylene glycol alginate, sodium alginate, sodium starch glycolate, starch tragacanth, and xanthan gum.

Sweetening agents such as sorbitol, saccharin, sodium saccharin, sucrose, aspartame, fructose, mannitol, and invert sugar can be added to improve the taste.

Preservatives and chelating agents such as alcohol, sodium benzoate, butylated hydroxyl toluene, butylated hydroxyanisole, and ethylenediamine tetraacetic acid can be added at levels safe for ingestion to improve storage stability.

According to the present disclosure, a liquid composition can also contain a buffer such as gluconic acid, lactic acid, citric acid, or acetic acid, sodium gluconate, sodium lactate, sodium citrate, or sodium acetate. Selection of excipients and the amounts used can be readily determined by the formulation scientist based upon experience and consideration of standard procedures and reference works in the field.

The solid compositions of the present disclosure include powders, granulates, aggregates, and compacted compositions. The dosages include dosages suitable for oral, buccal, rectal, parenteral (including subcutaneous, intramuscular, and intravenous), inhalant, and ophthalmic administration. Although the most suitable administration in any given case will depend on the nature and severity of the condition being treated, in embodiments the route of administration is oral. The dosages can be conveniently presented in unit dosage form and prepared by any of the methods well-known in the pharmaceutical arts.

Dosage forms include solid dosage forms like tablets, powders, capsules, suppositories, sachets, troches, and lozenges, as well as liquid syrups, suspensions, and elixirs.

The dosage form of the present disclosure can be a capsule containing the composition, in embodiments a powdered or granulated solid composition of the disclosure, within either a hard or soft shell. The shell can be made from gelatin and optionally contain a plasticizer such as glycerin and sorbitol, and an opacifying agent or colorant.

The active ingredient and excipients can be formulated into compositions and dosage forms according to methods known in the art.

A composition for tableting or capsule filling can be prepared by wet granulation. In wet granulation, some or all of the active ingredients and excipients in powder form are blended and then further mixed in the presence of a liquid, in embodiments water, that causes the powders to clump into granules. The granulate is screened and/or milled, dried, and then screened and/or milled to the desired particle size. The granulate can then be tableted, or other excipients can be added prior to tableting, such as a glidant and/or a lubricant.

A tableting composition can be prepared conventionally by dry blending. For example, the blended composition of the actives and excipients can be compacted into a slug or a sheet and then comminuted into compacted granules. The compacted granules can subsequently be compressed into a tablet.

As an alternative to dry granulation, a blended composition can be compressed directly into a compacted dosage form using direct compression techniques. Direct compression produces a more uniform tablet without granules. Excipients that are particularly well suited for direct compression tableting include microcrystalline cellulose, spray dried lactose, dicalcium phosphate dihydrate, and colloidal silica. The proper use of these and other excipients in direct compression tableting is known to those in the art with experience and skill in particular formulation challenges of direct compression tableting.

A capsule filling of the present disclosure can include any of the aforementioned blends and granulates that were described with reference to tableting, but they are not subjected to a final tableting step.

A pharmaceutical formulation of roluperidone may be formulated for administration to a mammal, in embodiments a human. roluperidone can be formulated, for example, as a viscous liquid solution or suspension, in embodiments a clear solution, for injection. The formulation can contain one or more solvents. A suitable solvent can be selected by considering the solvent's physical and chemical stability at various pH levels, viscosity (which would allow for syringeability), fluidity, boiling point, miscibility, and purity. Suitable solvents include alcohol USP, benzyl alcohol NF, benzyl benzoate USP, and Castor oil USP. Additional substances can be added to the formulation such as buffers, solubilizers, and antioxidants, among others, including those disclosed in Ansel et al., Pharmaceutical Dosage Forms and Drug Delivery Systems, 7th ed. The present disclosure encompasses a process to prepare said formulations of roluperidone by combining at least one of the above solid state forms and at least one pharmaceutically acceptable excipient.

The solid state forms as defined herein, as well as the pharmaceutical compositions or formulations of roluperidone can be used as medicaments, in embodiments for the treatment of schizophrenia.

The present disclosure also provides a method of treating schizophrenia, by administering a therapeutically effective amount of the solid state form of roluperidone of the present disclosure, or at least one of the above pharmaceutical compositions or formulations, to a subject suffering from schizophrenia or otherwise in need of the treatment.

The present disclosure also provides the use of the solid state forms of roluperidone of the present disclosure, or at least one of the above pharmaceutical compositions or formulations for the manufacture of a medicament for treating schizophrenia.

Having described the invention with reference to certain preferred embodiments, other embodiments will become apparent to one skilled in the art from consideration of the specification. The invention is further illustrated by reference to the following examples describing in detail the preparation of the composition and methods of use of the composition. It will be apparent to those skilled in the art that many modifications, both to materials and methods, may be practiced without departing from the scope of the disclosure.

Analytical Methods

Powder X-Ray Diffraction Pattern ("PXRD") Method:

Sample after being powdered in a mortar and pestle is applied directly on a silicon plate holder. The X-ray powder diffraction pattern was measured with Philips X'Pert PRO X-ray powder diffractometer, equipped with Cu irradiation source=1.54184 Å (Ångström), X'Celerator (2.022° 2θ) detector. Scanning parameters: angle range: 3-40 deg., step size 0.0167, time per step 37 s, continuous scan.

EXAMPLES

Roluperidone can be prepared according to the procedure described in U.S. Pat. No. 7,166,617.

Example 1: Preparation of Roluperidone HCl 2.02 grams of Roluperidone was dissolved in acetone (80 mL). 2.76 mL of HCl (2M) was added to the solution. The obtained suspension was stirred for 21 hours at 10° C. and then filtered over black ribbon filter paper under vacuum. Obtained solid was analyzed by PXRD.

Example 2: Preparation of Roluperidone HCl, Form 1

Roluperidone HCl (prepared according to Example 1) was placed in aluminum pan with a pin hole. Sample was then heated up at DSC Discovery TA instruments with 10° C./min to 150° C., kept isothermally for 5 minutes at 150° C., cooled down to 25° C. and analyzed by PXRD. Roluperidone HCl Form 1 was confirmed by PXRD.

Example 3: Preparation of Roluperidone HCl, Form 2

Roluperidone HCl (prepared according to Example 1) was placed in aluminum pan with a pin hole. Sample was then heated up at DSC Discovery TA instruments with 5° C./min to 200° C., kept isothermally for 5 minutes at 200° C., cooled down to 25° C. and analyzed by PXRD. Roluperidone HCl Form 2 was confirmed by PXRD.

Example 4: Preparation of Roluperidone HCl, Form 3

301 mg of Roluperidone HCl (prepared according to Example 1) was heated on reflux in 30 mL of toluene for about 6 hours, using Dean-Stark apparatus. After around 5 mL of solvent was accumulated in the apparatus the mixture was cooled down to room temperature, stirred for 2 days, and then filtered over black ribbon filter paper and dried in a stream of nitrogen gas. Obtained solid was analyzed. Roluperidone HCl Form 3 was confirmed by PXRD.

Example 5: Preparation of Roluperidone HCl, Form 4

Roluperidone HCl, Form 3 (prepared according to Example 4) was placed in aluminum pan with a pin hole. Sample was then heated up at DSC Discovery TA instruments with 10° C./min to 164° C., kept isothermally for 5 minutes at 164° C., cooled down to 25° C. and analyzed by PXRD. Roluperidone HCl Form 4 was confirmed by PXRD.

Example 6: Preparation of Roluperidone, Form I

Roluperidone (50 mg) was dissolved in 1 ml of 1-buthanole (n-butanol) at room temperature. Prepared solution was left open at room conditions for solvent to evaporate. Crystals occurred after 13 days and were filtrated off and analyzed by PXRD. Roluperidone Form I was confirmed by PXRD.

Example 7: Preparation of Roluperidone, Form I

Roluperidone (50 mg) was dissolved in 4 ml of acetone/water mixture (1:1) at reflux temperature. Prepared solution was left open at room conditions for solvent to evaporate. Crystals occurred after 3 days and were filtrated off and analyzed by PXRD. Roluperidone Form I was confirmed by PXRD.

Example 8: Preparation of Roluperidone Hydrochloride Form 4

Roluperidone base Form I (1.0 gram) was suspended in mixture of tetrahydrofuran and n-heptane (1:20) and stirred at 50° C. for 1 hour. 2 ml (2.0 eq) of Hydrochloric acid (5.5M solution in 2-propanol) was added into the reaction mixture and stirred at 50° C. for 2.5 hours. The reaction mixture was cooled to 20-25° C. and stirred for 3 hours. Suspension was filtrated off and isolated crude was dried for 1 hour at 70° C. under reduce pressure. Roluperidone HCl Form 4 was confirmed by PXRD.

Example 9: Preparation of Co-Crystal of Roluperidone Hydrochloride and Maleic Acid Form M1 (2:1)

Roluperidone hydrochloride (65 mg) and 2 eq. of maleic acid (35 mg) were suspended in 1 ml of ethyl acetate at 50° C. for 5 hours. The obtained solid corresponds to Roluperidone hydrochloride and maleic acid co-crystal Form M1, as confirmed by PXRD (2:1 ratio based on NMR analysis).

Example 10: Preparation of Co-Crystal of Roluperidone Hydrochloride and Maleic Acid Form M1

Roluperidone hydrochloride (65 mg) and 2 eq. of maleic acid (35 mg) were suspended in 1 ml of MIBK at room conditions for 5 hours. The obtained solid corresponds to Roluperidone hydrochloride and maleic acid co-crystal Form M1, as confirmed by PXRD.

Example 11: Preparation of Co-Crystal of Roluperidone Hydrochloride and Maleic Acid Form M1

Roluperidone hydrochloride Form 4 (64 mg, obtained according to Example 8) and 2 eq. of maleic acid (36 mg) were suspended in 1 ml of ethyl acetate at 50° C. for 5 hours. The obtained solid corresponds to Roluperidone hydrochloride and maleic acid co-crystal Form M1, as confirmed by PXRD.

Example 12: Preparation of Co-Crystal of Roluperidone Hydrochloride and Maleic Acid Form M1

Roluperidone hydrochloride Form 4 ((64 mg, obtained according to Example 8) and 2 eq. of maleic acid (36 mg) were suspended in 1 ml of acetone at 50° C. for 5 hours. The obtained solid corresponds to Roluperidone hydrochloride and maleic acid co-crystal Form M1, as confirmed by PXRD.

Example 13: Preparation of Roluperidone Hydrochloride Form 6

1.501 grams of Roluperidone HCl was dissolved in 7 mL of ethanol at 37° C. 22 mL of ethyl acetate was added dropwise to the solution. Obtained suspension was heated to reflux for 3 hours, and then cooled to room temperature and stirred for 5 hours. Suspension was filtrated off and isolated material was analyzed. Roluperidone HCl Form 6 was confirmed by PXRD.

Example 14: Preparation of Co-Crystal of Roluperidone Hydrochloride and Maleic Acid Form M1

820 mg of Roluperidone HCl was dissolved in 17 mL of IPA/MIBK (0.4:1) solvent mixture at 67° C. in a 25 mL round flask, with magnetic stirrer and thermometer. 186 mg of maleic acid was added to the solution at 67° C. The reaction mixture was stirred for 30 minutes at 67° C. Then the heating is turned off, and the mixture was left to stir overnight at room temperature. Then the mixture was cooled to 0-5° C. in the ice bath for 30 minutes. The precipitate was filtrated over black ribbon filter paper on Buchner funnel with vacuum. The sample was dried on 60° C. under vacuum for 1 hour. The obtained solid corresponds to Roluperidone hydrochloride and maleic acid co-crystal Form M1, as confirmed by PXRD.

Example 15: Preparation of Roluperidone Hydrochloride Form 4

1.0 gram of Roluperidone base Form I was suspended in mixture of n-heptane (50 ml) and tetrahydrofuran (2.5 ml) and stirred at 50° C. for 10 minutes. 1 ml of HCl (g) in 2-propanol (5-6M in 2-propanol) was added dropwise and continued stirring at 50° C. for 90 minutes, after which it was cooled and stirred for 120 minutes. Crude material was filtrated off and dried for 1 hour at 70° C. under vacuum. Roluperidone HCl Form 4 was confirmed by PXRD.

Example 16: Preparation of Roluperidone Hydrochloride Form 4

Roluperidone base Form I (1.0 gram) was suspended in mixture of tetrahydrofuran and n-heptane (52.5 ml, 1:20 THF:n-heptane) and stirred at 50° C. for 1 hour. 2 ml (2.0 eq) of HCl (g) in 2-propanol (5.5M solution) was added into the reaction mixture and stirred at 50° C. for 2.5 hours. The reaction mixture was cooled to 20-25° C. and stirred for 3 hours. The suspension was filtered off and dried for 1 hour at 70° C. under reduced pressure. Roluperidone HCl Form 4 was confirmed by PXRD.

Example 17: Preparation of Co-Crystal of Roluperidone Hydrochloride and Maleic Acid Form M1 (2:1)

Roluperidone hydrochloride Form 4 (65 mg) and 2 eq. of maleic acid (35 mg) were suspended in 1 ml of ethyl acetate at 50° C. for 5 hours. The solid was filtered off and dried by suction on the filter. The obtained solid corresponds to Roluperidone hydrochloride and maleic acid co-crystal Form M1, as confirmed by PXRD (2:1 ratio based on NMR analysis).

Example 18: Preparation of Co-Crystal of Roluperidone Hydrochloride and Maleic Acid Form M1

Roluperidone hydrochloride (65 mg) Form 4 and 2 eq. of maleic acid (35 mg) were suspended in 1 ml of MIBK at room conditions for 5 hours. The solid was filtered off and dried by suction on the filter. The obtained solid corresponds to Roluperidone hydrochloride and maleic acid co-crystal Form M1, as confirmed by PXRD.

Example 19: Preparation of Co-Crystal of Roluperidone Hydrochloride and Maleic Acid Form M1

Roluperidone hydrochloride Form 4 (64 mg, obtained according to Example 16) and 2 eq. of maleic acid (36 mg) were suspended in 1 ml of ethyl acetate at 50° C. for 5 hours. The solid was filtered off and dried by suction on the filter. The obtained solid corresponds to Roluperidone hydrochloride and maleic acid co-crystal Form M1, as confirmed by PXRD.

Example 20: Preparation of Co-Crystal of Roluperidone Hydrochloride and Maleic Acid Form M1

Roluperidone hydrochloride Form 4 (64 mg, obtained according to Example 16) and 2 eq. of maleic acid (36 mg) were suspended in 1 ml of acetone at 50° C. for 5 hours. The solid was filtered off and dried by suction on the filter. The obtained solid corresponds to Roluperidone hydrochloride and maleic acid co-crystal Form M1, as confirmed by PXRD.

Example 21: Preparation of Roluperidone Hydrochloride Form 6

1.501 grams of Roluperidone HCl was dissolved in 7 mL of ethanol at 37° C. 22 mL of ethyl acetate at room temperature was added dropwise to the solution. The resulting suspension was heated to reflux for 3 hours, cooled to room temperature and stirred for 5 hours. Suspension was filtered off and isolated material was dried for 2 hours under vacuum at 50° C. Roluperidone HCl Form 6 was confirmed by PXRD.

Example 22: Preparation of Co-Crystal of Roluperidone Hydrochloride and Maleic Acid Form M1

820 mg of Roluperidone HCl Form A was dissolved in 17 mL of IPA/MIBK (0.4:1) solvent mixture at 67° C. in a 25 mL round flask, with magnetic stirrer and thermometer. 186 mg of maleic acid was added to the solution at 67° C. The reaction mixture was stirred for 30 minutes at 67° C. Then the heating is turned off, and the mixture was left to stir overnight at room temperature. Then the mixture was cooled to 0-5° C. in the ice bath for 30 minutes. The precipitate was filtrated over black ribbon filter paper on Buchner funnel with vacuum. The sample was dried at 60° C. under vacuum for 1 hour. The obtained solid corresponds to Roluperidone hydrochloride and maleic acid co-crystal Form M1, as confirmed by PXRD.

The invention claimed is:

1. A crystalline form of roluperidone HCl designated as Form 4, which is characterized by data selected from one or more of the following:
    (a) a PXRD pattern having peaks at 9.8, 12.3, 20.5 and 25.1 degrees 2-theta±0.2 degrees 2-theta;
    (b) a PXRD pattern having peaks at 9.8, 11.6, 12.3, 20.5 and 25.1 degrees 2-theta±0.2 degrees 2-theta; and
    (c) a PXRD pattern substantially as depicted in FIG. 5.

2. A crystalline form of roluperidone HCl according to claim 1, which is characterized by a PXRD pattern having peaks at 9.8, 12.3, 20.5 and 25.1 degrees 2-theta±0.2 degrees 2-theta; and also having one, two, three, four or five additional peaks at 11.6, 15.4, 18.9, 23.0 and 24.0 degrees 2-theta±0.2 degrees 2-theta.

3. A crystalline form of roluperidone HCl according to claim 1, which is characterized by a PXRD pattern having peaks at 9.8, 11.6, 12.3, 20.5 and 25.1 degrees 2-theta±0.2 degrees 2-theta; and also having one, two, three, four or five additional peaks at 11.6, 15.4, 18.9, 23.0 and 24.0 degrees 2-theta±0.2 degrees 2-theta.

4. A crystalline form of roluperidone HCl according to claim 1, which is characterized by a PXRD pattern having peaks at 9.8, 11.6, 12.3, 20.5 and 25.1 degrees 2-theta±0.2 degrees 2-theta; and also having one, two, three, or four additional peaks at 15.4, 18.9, 23.0 and 24.0 degrees 2-theta±0.2 degrees 2-theta.

5. A crystalline form of roluperidone HCl according to claim 1, which is characterized by a PXRD pattern having peaks at 9.8, 11.6, 12.3, 15.4, 18.9, 20.5, 23.0, 24.0 and 25.1 degrees 2-theta±0.2 degrees 2-theta.

6. A crystalline form of roluperidone HCl according to claim 1, which is a hydrate form.

7. A crystalline form of roluperidone HCl according to claim 1, wherein the molar ratio of roluperidone HCl to water is from about 0.5 to about 1.

8. A crystalline form of roluperidone HCl which is a co-crystal of roluperidone HCl and maleic acid.

9. A crystalline form of roluperidone HCl according to claim 8, wherein the molar ratio of roluperidone HCl to maleic acid is between about 2.5:1.5 and 1:1.

10. A crystalline form of roluperidone HCl according to claim 8, which is designated as Form M1, and which is characterized by data selected from one or more of the following:

(a) a PXRD pattern having peaks at 5.3, 7.9, 10.5, 13.1 and 14.8 degrees 2-theta±0.2 degrees 2-theta; and (b) a PXRD pattern as depicted in FIG. 7.

11. A crystalline form of roluperidone HCl according to claim 8, which is characterized by a PXRD pattern having peaks at 5.3, 7.9, 10.5, 13.1 and 14.8 degrees 2-theta±0.2 degrees 2-theta, and also having one, two, three, four or five additional peaks at 15.8, 16.5, 18.4, 24.9 and 30.3 degrees 2-theta±0.2 degrees 2-theta.

12. A crystalline form of roluperidone HCl according to claim 8, which is characterized by a PXRD pattern having peaks at 5.3, 7.9, 10.5, 13.1, 14.8, 15.8, 16.5, 18.4, 24.9 and 30.3 degrees 2-theta±0.2 degrees 2-theta.

13. A crystalline form of roluperidone HCl according to claim 8, which is an anhydrous form.

14. A process for preparing other solid state forms of roluperidone hydrochloride, roluperidone, solid state forms of roluperidone, other pharmaceutically acceptable salts of roluperidone and solid state forms thereof, comprising preparing a crystalline form of roluperidone hydrochloride according to claim 1, and converting it to other solid state forms of roluperidone hydrochloride, roluperidone, solid state forms of roluperidone, other pharmaceutically acceptable salts of roluperidone and solid state forms thereof.

15. A pharmaceutical formulation or a pharmaceutical composition comprising the crystalline form of roluperidone hydrochloride according to claim 1.

16. The pharmaceutical formulation of claim 15, comprising an oral formulation.

17. A pharmaceutical formulation comprising the crystalline form of roluperidone hydrochloride according to claim 1, and at least one pharmaceutically acceptable excipient.

18. A pharmaceutical formulation according to claim 17, which is an oral formulation.

19. A process for preparing a pharmaceutical formulation comprising combining a crystalline form of roluperidone hydrochloride according to claim 1, with at least one pharmaceutically acceptable excipient.

20. A method of treating a disorder selected from schizophrenia, schizophrenia symptoms in treatment-naïve schizophrenia patients, schizophrenia with anhedonia, social avoidance, hallucination, delusions, Alzheimer's disease, Parkinson's disease, or depression, comprising administering a therapeutically effect amount of a crystalline form of roluperidone hydrochloride according to claim 1 to a patient in need of treatment.

* * * * *